Nov. 15, 1938.     S. STRATY     2,136,474
ALLOY LINING FOR TUBULAR PARTS
Filed May 15, 1936

INVENTOR.
Stephen Straty
BY
ATTORNEY.

Patented Nov. 15, 1938

2,136,474

UNITED STATES PATENT OFFICE 2,136,474

ALLOY LINING FOR TUBULAR PARTS

Stephen Straty, Milwaukee, Wis., assignor to A. O. Smith Corporation, Milwaukee, Wis., a corporation of New York Application May 15, 1936, Serial No. 79,935

3 Claims. (Cl. 220—63)

This invention relates to alloy lining for tubular parts and more particularly to the lining of tubular connections for pressure vessels where the service subjects the lining to wide changes in temperature.

The object of the invention is to provide a joint between the alloy lining for the vessel and the alloy lining for the tubular connection which will allow for expansion and contraction in the length of the liner for the tubular connection.

The accompanying drawing illustrates an embodiment of the invention.

Figure 1:
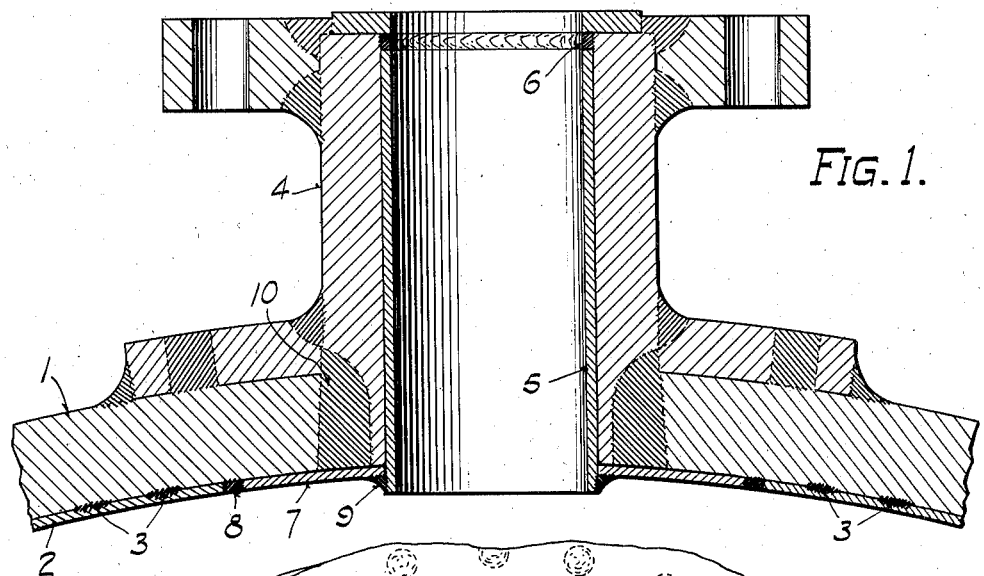
Figure 2:
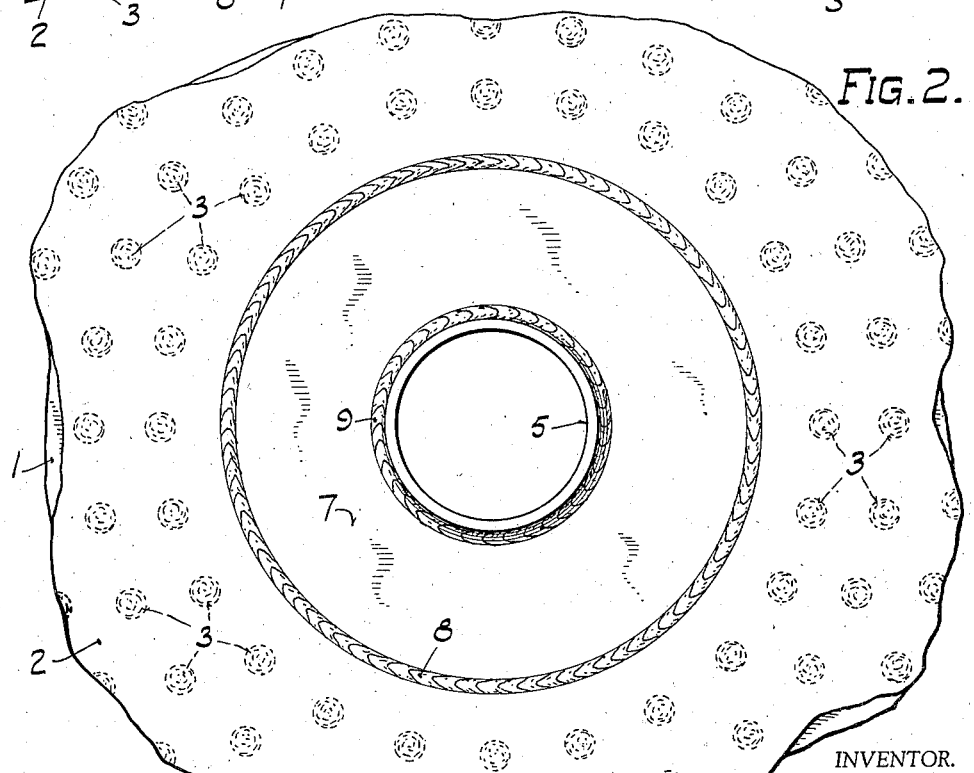

Figure 1 is a broken transverse section through the vessel wall showing the tubular connection; and Fig. 2 is a plan view of the inside of the vessel around the opening of the tubular connection as viewed from the bottom in Fig. 1.

The vessel 1 is preferably constructed of heavy plates of plain carbon steel and has an alloy lining 2 secured to the plates throughout the interior of the vessel as by spot welds 3 to protect the plates from corrosion.

The tubular connection 4 is welded to the vessel 1 in any suitable manner and has an alloy lining 5 secured therein to protect the same from corrosion. The lining 5 is welded at its outer end to the connection 4 by a circumferential weld 6. Under rapid changes of temperature of the fluid being treated in the vessel, and particularly in case the alloy lining 5 has a different thermal coefficient of expansion from the metal of the connection 4, difficulty has arisen in providing a satisfactory fluid-tight joint between lining 2 and lining 5.

In carrying out the present invention the lining 2 is cut away or omitted around the connection 4 to form an opening in the liner of substantially greater diameter than said connection. The lining 5 is made to extend into the vessel a distance greater than the thickness of liner 2. Then an alloy expansion disk 7 is placed to cover that portion of the vessel wall 1 lying between the end portion of liner 5 and the edge of liner 2. The disk 7 is alloy welded at its outer circumference, as at 8 to the edge of liner 2 and to the vessel wall 1. At the inner edge of the disk 7 and surrounding the projecting end of the cylindrical liner 5 is an alloy fillet weld 9 which joins disk 7 to liner 5 with a fluid-tight joint but does not weld the same to the carbon steel beneath.

In the manufacture of this construction where a weld 10 is employed to secure the carbon steel connection 4 to the edge of the vessel wall 1, it is sometimes advisable to grind or otherwise level off the weld 10 before applying the disk 7. Furthermore, in making the fillet weld 9 it may be advisable to have the inner edge of disk 7 spaced from the carbon steel beneath so that any subsequent contraction upon cooling of liner 5 will not unduly stress the weld.

The freedom of movement of the inner edge of the disk 7 allows adequate expansion and contraction of the cylindrical liner sheet 5 and thereby prevents rupture of the fluid-tight joint 9.

The invention is claimed as follows:

1. A tubular connection applied to an opening in a plate, comprising a relatively short tubular connection welded at its inner end to the plate surrounding an opening therein and having connecting means at its outer end, a cylindrical lining anchored at the outer end of the connection and extending inwardly through the opening in the plate, said lining being movable at its inner end relative to the connection under conditions of thermal change, an alloy expansion disk substantially concentric with said opening designed to follow closely the contour of the plate, and welded at its outer circumference to the plate, and an alloy weld joining the inner edge of said expansion disk with the inner end of the cylindrical lining and leaving said lining free to move under conditions of thermal expansion and contraction.

2. An alloy lining for a tubular connection and pressure vessel, comprising a cylindrical lining welded at its outer end to the connection and extending inwardly through the opening in the vessel wall, a corrosion-resistant lining for said vessel having an opening concentric with and larger than the opening in said tubular connection, an expansion disk substantially concentric with said openings and welded at its outer circumference to the edge of said corrosion-resistant lining for said vessel and to the vessel wall, and a corrosion-resistant fillet weld joining the inner edge of said expansion disk with the inner end of the cylindrical lining for said connection.

3. A tubular connection and pressure vessel, comprising a relatively short tubular connection welded at its inner end to the vessel wall surrounding an opening therein and having connecting means at its outer end, a cylindrical lining welded at its outer end to the connection and extending inwardly through the opening in the vessel wall, said lining being movable at its inner end relative to the connection under conditions of thermal change, a corrosion-resistant lining for said vessel, an expansion disk designed to follow closely the contour of the vessel wall substantially concentric with said opening and welded at its outer circumference to said corrosion-resistant lining for said vessel, and a corrosion-resistant fillet weld joining the inner edge of said expansion disk with the inner end of the cylindrical lining for said connection and leaving said cylindrical lining free to move under conditions of thermal expansion and contraction.

STEPHEN STRATY.